(12) United States Patent
Poag et al.

(10) Patent No.: US 11,371,654 B2
(45) Date of Patent: Jun. 28, 2022

(54) PRESSURE BUILDING CRYOGENIC FLUID DELIVERY SYSTEM

(71) Applicant: Chart Inc., Ball Ground, GA (US)

(72) Inventors: Brian Poag, Ball Ground, GA (US); Jason Strom, Canton, GA (US)

(73) Assignee: Chart Inc., Ball Ground, GA (US)

(*) Notice: Subject to any disclaimer, the term of this patent is extended or adjusted under 35 U.S.C. 154(b) by 0 days.

(21) Appl. No.: 15/962,107

(22) Filed: Apr. 25, 2018

(65) Prior Publication Data

US 2018/0306383 A1 Oct. 25, 2018

Related U.S. Application Data

(60) Provisional application No. 62/489,575, filed on Apr. 25, 2017.

(51) Int. Cl.
*F17C 7/04* (2006.01)
*F17C 9/02* (2006.01)

(52) U.S. Cl.
CPC .............. *F17C 9/02* (2013.01); *F17C 7/04* (2013.01); *F17C 2221/033* (2013.01);
(Continued)

(58) Field of Classification Search
CPC ...... F17C 2227/0306; F17C 2227/0339; F17C 2270/0168; F17C 2265/066;
(Continued)

(56) References Cited

U.S. PATENT DOCUMENTS 1,942,944 A * 1/1934 Smith ................... F17C 7/04
62/50.2
5,373,700 A  12/1994 McIntosh
(Continued)

FOREIGN PATENT DOCUMENTS

CA   2 653 643 A1   5/2009
CN   201354692 Y   12/2009
(Continued)

OTHER PUBLICATIONS

International Search Report and Written Opinion for PCT/US2018/029441 dated Aug. 10, 2018.
(Continued)

*Primary Examiner* — Brian M King
(74) *Attorney, Agent, or Firm* — Cook Alex Ltd.

(57) ABSTRACT

A tank is configured to store a supply of cryogenic liquid and a heat exchanger has a main line and a reheat line. A liquid pickup line directs cryogenic liquid from the tank to the main line of the heat exchanger. A trim heater exit tee receives fluid from the main line of the heat exchanger. Fluid exits the trim heater exit tee through an engine outlet and a trim heater outlet. Fluid exiting through the engine outlet flows through a flow restriction device and to a primary inlet of a trim heater return tee. A trim heater line receives fluid from the trim heater outlet of the trim heater exit tee and directs it to the reheat line of the heat exchanger after the fluid passes through a portion of the trim heater line positioned within the tank. Warmed fluid leaving the reheat line of the heat exchanger travels to a trim heater inlet of the trim heater return tee.

25 Claims, 2 Drawing Sheets

(52) U.S. Cl.
CPC ............... *F17C 2223/0161* (2013.01); *F17C 2223/035* (2013.01); *F17C 2223/046* (2013.01); *F17C 2225/0123* (2013.01); *F17C 2225/035* (2013.01); *F17C 2227/0107* (2013.01); *F17C 2227/0306* (2013.01); *F17C 2227/039* (2013.01); *F17C 2227/0374* (2013.01); *F17C 2227/0381* (2013.01); *F17C 2227/0393* (2013.01); *F17C 2265/066* (2013.01); *F17C 2270/0168* (2013.01); *F17C 2270/0178* (2013.01)

(58) Field of Classification Search
CPC ............... F17C 2221/033; F17C 7/04; F17C 2270/0178; F17C 2227/0374; F17C 2227/0381; F17C 2227/0393; F17C 2227/0107; F17C 2225/035; F17C 2223/046; F17C 2223/035
See application file for complete search history.

(56) References Cited

U.S. PATENT DOCUMENTS

| | | |
|---|---|---|
| 2010/0236259 A1 | 9/2010 | Brunner et al. |
| 2011/0314839 A1 | 12/2011 | Brook et al. |
| 2013/0232997 A1 | 9/2013 | Gustafson |
| 2014/0096539 A1 | 4/2014 | Gustafson et al. |
| 2014/0223924 A1* | 8/2014 | Gustafson .......... F02M 21/0212 62/45.1 |
| 2015/0072260 A1 | 3/2015 | Brunner et al. |
| 2016/0281932 A1 | 9/2016 | Karlsson |

FOREIGN PATENT DOCUMENTS

| | | |
|---|---|---|
| CN | 102235269 A | 11/2011 |
| CN | 102562365 B | 7/2012 |
| CN | 105840350 A | 8/2016 |
| FR | 2706822 A1 | 12/1994 |
| JP | 2006046211 A | 2/2006 |
| JP | 4378666 B | 12/2009 |
| JP | 2016-173101 A | 9/2016 |
| WO | WO 94/18493 A1 | 8/1994 |
| WO | 2011055045 A1 | 5/2011 |
| WO | WO 2015/183966 A1 | 12/2015 |

OTHER PUBLICATIONS

European Search Report, dated Jun. 28, 2018 for Application No. 18169345.8-1010.

Communication Notice of a Notice of Opposition Issued by The European Patent Office for European Application No. EP18169345.8, dated Nov. 27, 2020—With English Translation (43 pages).

First Office Action Issued by China National Intellectual Property Administration for Application No. 201880027776.9, dated Apr. 6, 2021—With English Translation (11 pages).

Examination Report Under Sections 12 & 13 of the Patents Act, 1970 and the Patents Rules, 2003 for Indian Application No. 201917041943 dated Aug. 8, 2021.

Japanese Office Action for Japanese Application No. 2019-556891 dated Sep. 22, 2021 and translation.

* cited by examiner

PRESSURE BUILDING CRYOGENIC FLUID DELIVERY SYSTEM

CLAIM OF PRIORITY

This application claims the benefit of U.S. Provisional Application No. 62/489,575, filed Apr. 25, 2017, the contents of which are hereby incorporated by reference.

FIELD OF THE INVENTION

The present disclosure relates generally to cryogenic fluid delivery systems and, more specifically, to a pressure building cryogenic fluid delivery system.

BACKGROUND

Cryogenic fluid delivery systems are often used to provide the fluids to use devices as fuel or for other uses. For example, one type of cryogenic fluid delivery system provides liquid natural gas (LNG) as fuel to the engine of an LNG-powered vehicle and must be mounted on the chassis of the vehicle, along with the LNG storage tank.

Many natural gas fuel systems require high fuel delivery pressures to satisfy the engine's flow requirements. Optimally saturated LNG is not always available at fueling stations. Also, desaturation is caused in high use applications where the fuel is being withdrawn continuously from the vessel and at a high rate. Both of these can lead to low pressure problems resulting in inadequate flow to natural gas engines.

A need exists for a cryogenic fluid delivery system that addresses the above low pressure issues.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as set forth in the claims appended hereto.

In one aspect, an integrated cryogenic fluid delivery system includes a tank configured to store a supply of cryogenic liquid and a heat exchanger having a main line and a reheat line. A liquid pickup line has an inlet configured to receive cryogenic liquid from the tank and an outlet in fluid communication with an inlet of the main line of the heat exchanger. A trim heater exit tee has an inlet in fluid communication with an outlet of the main line of the heat exchanger, a trim heater outlet and an engine outlet. A trim heater return tee has a primary inlet, a trim heater inlet and a combined stream outlet. A flow restriction device has an inlet in fluid communication with the engine outlet of the trim heater exit tee and an outlet in fluid communication with the primary inlet of the trim heater return tee. A trim heater line has an inlet in fluid communication with the trim heater outlet of the trim heater exit tee and an outlet in fluid communication with an inlet of the reheat line of the heat exchanger. A portion of the trim heater line is positioned within the tank. An outlet of the reheat line of the heat exchanger is in fluid communication with the trim heater inlet of the trim heater return tee.

In another aspect, a system for delivering cryogenic fluid from a tank includes a heat exchanger having a main line and a reheat line. A liquid pickup line has an inlet configured to receive cryogenic liquid from the tank and an outlet in fluid communication with an inlet of the main line of the heat exchanger. A trim heater exit tee has an inlet in fluid communication with an outlet of the main line of the heat exchanger, a trim heater outlet and an engine outlet. A trim heater return tee has a primary inlet, a trim heater inlet and a combined stream outlet. A flow restriction device has an inlet in fluid communication with the engine outlet of the trim heater exit tee and an outlet in fluid communication with the primary inlet of the trim heater return tee. A trim heater line has an inlet in fluid communication with the trim heater outlet of the trim heater exit tee and an outlet in fluid communication with an inlet of the reheat line of the heat exchanger. A portion of the trim heater line is positioned within the tank. An outlet of the reheat line of the heat exchanger is in fluid communication with the trim heater inlet of the trim heater return tee.

In another aspect, a method of delivering a cryogenic fluid to a use device includes the steps of storing a cryogenic liquid in a tank, vaporizing cryogenic liquid from the tank in a heat exchanger to provide a cryogenic vapor, directing a first portion of the cryogenic vapor to the use device, directing a second portion of the cryogenic vapor to the tank to warm the stored cryogenic liquid whereby a cooled cryogenic vapor is produced, warming the cooled cryogenic vapor in the heat exchanger to produce a trim heated cryogenic vapor and combining the trim heated cryogenic vapor with the first portion of the cryogenic vapor for delivery to the use device.

DETAILED DESCRIPTION OF EMBODIMENTS

The embodiments of the system of the disclosure described below provide an integrated delivery system of liquefied natural gas (LNG) from a storage tank to a use device, such as a natural gas powered vehicle engine. It is to be understood that the invention may alternatively be used to deliver or dispense other types of cryogenic fluids.

Embodiments of the disclosure include a circuit for building tank pressure while product is being withdrawn in order to effectively add enough heat and pressure into the tank to build pressure and solve low pressure issues.

Figure 1:
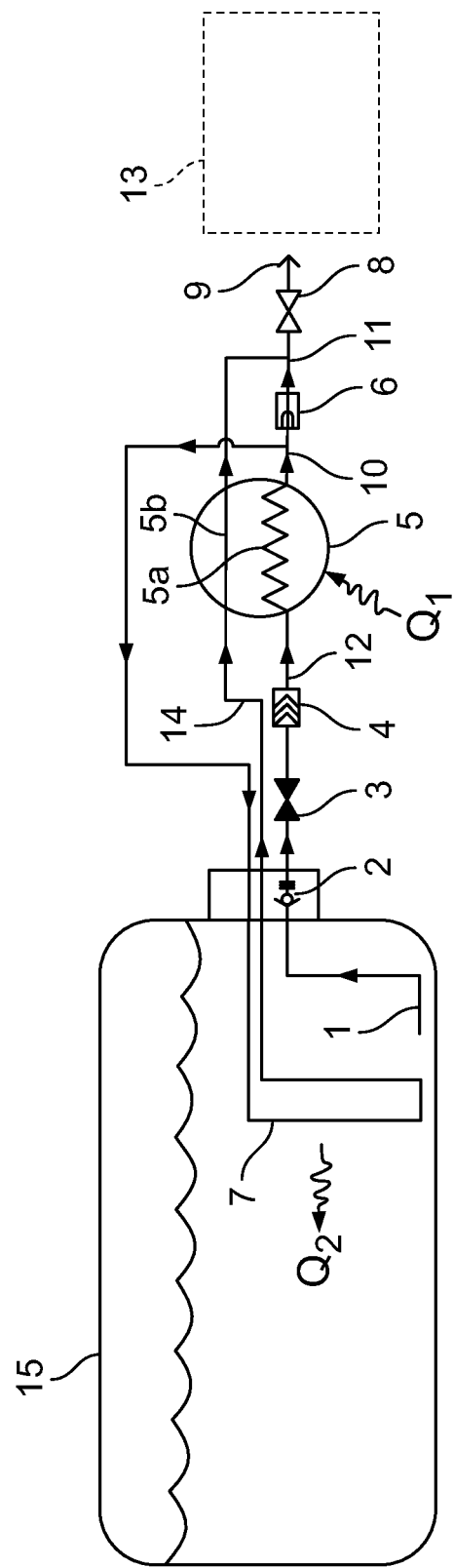
FIG. 1 is a schematic view of an embodiment of the pressure building cryogenic fluid delivery system of the disclosure.
Figure 2:
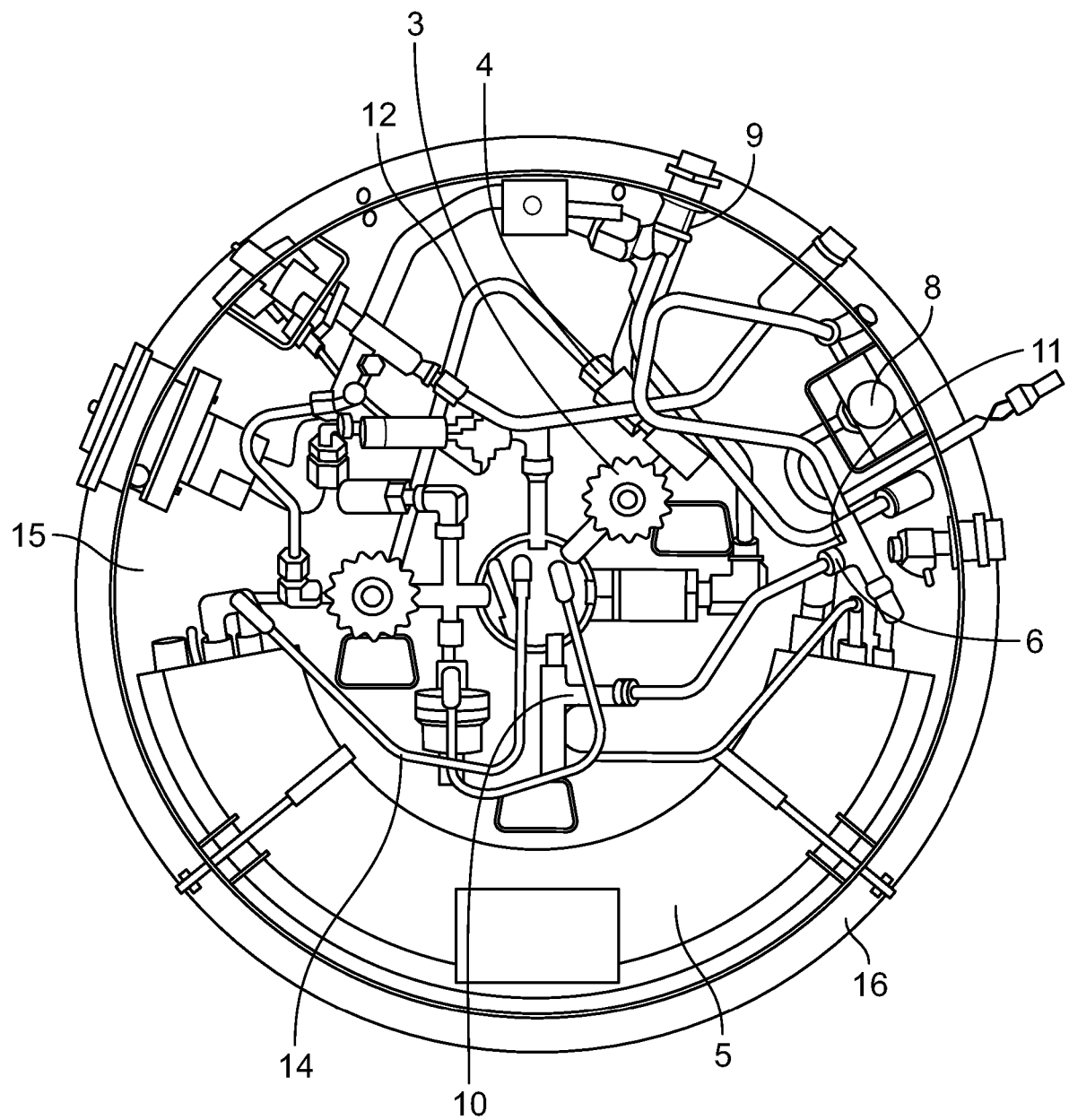
FIG. 2 is a rear elevational view of the system of FIG. 1.

With reference to FIGS. 1 and 2, fuel stored in tank 15 enters the Liquid Pickup Line 1 and passes through the Check Valve 2, Manual Valve 3, Excess Flow Valve 4, and enters the main passage or Main Line 5a of the Heat Exchanger 5 via line 12. The heat exchanger adds heat (Q1) to and vaporizes the natural gas via hot engine coolant flowing through its shell and making contact with the tubes carrying the LNG.

As examples only, the heat exchanger 5 may be configured as described U.S. Pat. No. 9,829,156 or U.S. patent application Ser. No. 15/924,779, both to Chart Inc., the contents of both of which are hereby incorporated by reference, a shell and tube heat exchanger or other heat exchanger known in the art.

The flow of natural gas vapor exiting the Heat Exchanger splits with a portion continuing to the engine (indicated in phantom at 13 in FIG. 1) and the remainder diverted back so as to travel through the tank via the Tank Heater Line 7. As a result, the Tank Heater Line 7 delivers Heat (Q2) into the tank 15, causing an increase in internal tank pressure.

The flow back into the Tank Heater Line is made possible by a flow restriction device, such as Orifice 6, which causes a differential pressure between the Exit Tee 10 and Return Tee 11 of the Tank Heater Line 7. The pressure build rate can be manipulated by increasing or decreasing the size of the orifice, that is, reducing the size of the orifice will cause more flow to be directed into the Tank Heater Line thus causing a higher pressure build rate. Alternatively, using a larger orifice will allow more flow to be directed to the engine, thus reducing amount of flow into the Tank Heater Line and, in turn, decrease pressure build rate. An orifice is used herein to control the pressure build rate, however ones skilled in the art know that the flow can also be manipulated via a needle valve, regulator, check valve or any other flow restriction device known in the art, all of which the invention encompasses. As another alternative, which the invention encompasses, the piping or lines downstream of the Exit Tee 10 may include diameters, bends and/or lengths that create a pressure building system to serve as the flow restriction device so that an orifice, needle valve, regulator, check valve or other dedicated component is not required.

The gas within Tank Heater Line 7 will typically be cold upon exiting from inside the tank, and thus the cooled gas can be routed back, via line 14, into a second pass Reheat Line 5b of the Heat Exchanger 5 in order to warm it back up for engine delivery. After exiting the Reheat Line 5b, the gas will mix back in with the fuel delivery gas at the Return Tee 11, and go through the Automatic Valve 8 and then to the engine 13 as indicated at 9 in FIG. 1.

The Liquid Pickup Line 1 may be provided with an economizer circuit, as disclosed in Chart Inc. U.S. Pat. No. 9,829,156. When so equipped, the system of FIGS. 1 and 2 is prevented from over-pressurizing the tank 15 by an "Economizer" or "Auto-Refrigeration" valve of the economizer circuit opening once the pressure within the tank gets to the valve set-point. When the economizer circuit valve is open, heat-laden vapor is removed from the tank, via the economizer circuit and the liquid pickup line 1, and is delivered from the system to the engine, thus keeping a steady internal tank pressure. The present system may also have the same pressure relief, fill, level control, vent, and cold fuel detection devices of Chart Inc. U.S. Pat. No. 9,829,156.

Although a coolant-warmed heat exchanger is described here, ambient vaporizers, electric heaters, or other suitable heat exchangers could be used. Furthermore, whilst the system is described using LNG, the invention could be used for any other cryogenic system as well that has to have pressure being built during product delivery in order to solve the low pressure issues described above.

Cryogenic fluid delivery systems must often be installed in environments that have considerable space limitations. For example, the components of a system for providing liquid natural gas (LNG) to the engine of an LNG-powered vehicle must be mounted on the chassis of the vehicle, along with the LNG storage tank. As a result, as illustrated in FIG. 2, it is desirable to integrate all of the components of the system into one assembly. The assembly of components may be positioned within in a shroud 16 which may be attached to an end wall or head of the tank containing the LNG, as taught in Chart Inc. U.S. Pat. No. 9,829,156.

While the preferred embodiments of the disclosure have been shown and described, it will be apparent to those skilled in the art that changes and modifications may be made therein without departing from the spirit of the disclosure, the scope of which is defined by the following claims.

What is claimed is:

1. A cryogenic fluid delivery system comprising:
   a. a tank configured to store a supply of cryogenic liquid;
   b. a heat exchanger having a main line and a reheat line;
   c. a liquid pickup line having an inlet configured to receive cryogenic liquid from the tank and an outlet in fluid communication with the main line of the heat exchanger;
   d. a trim heater exit tee having an inlet in fluid communication with the main line of the heat exchanger, a trim heater outlet and an engine outlet;
   e. a trim heater return tee having a primary inlet, a trim heater inlet and a combined stream outlet;
   f. a flow restriction device having a flow restriction device inlet and a flow restriction device outlet;
   g. an uninterrupted flow passage extending from the engine outlet of the exit tee to the flow restriction device inlet;
   h. said flow restriction device inlet configured to receive fluid from the engine outlet of the trim heater exit tee and said flow restriction device outlet configured to direct fluid to the primary inlet of the trim heater return tee, said flow restriction device configured to provide a partial flow of fluid therethrough so as to cause a differential pressure between the trim heater exit tee and the trim heater return tee so that a primary portion of fluid from the main line of the heat exchanger flows continuously through the engine outlet and a remainder portion of fluid from the main line of the heat exchanger is simultaneously diverted through the trim heater; and
   i. a trim heater line having an inlet in fluid communication with the trim heater outlet of the trim heater exit tee and an outlet in fluid communication with an inlet of the reheat line of the heat exchanger, wherein a portion of the trim heater line is positioned within the tank, and wherein an outlet of the reheat line of the heat exchanger is in fluid communication with the trim heater inlet of the trim heater return tee so that said trim heater return tee combines the primary portion of fluid and the remainder portion of fluid.

2. The system of claim 1 further comprising an excess flow valve having an inlet in fluid communication with the liquid pickup line and an outlet in fluid communication with the main line of the heat exchanger.

3. The system of claim 2 further comprising a fuel shut off valve having an inlet in fluid communication with the liquid pickup line and an outlet in fluid communication with the inlet of the excess flow valve.

4. The system of claim 3 further comprising a check valve having an inlet in fluid communication with the liquid pickup line and an outlet in fluid communication with the inlet of the fuel shut off valve.

5. The system of claim 1 wherein the flow restriction device is an orifice, a needle valve, a regulator or a check valve.

6. The system of claim 1 wherein the heat exchanger includes:
   a. a shell defining a warming fluid chamber and having a shell inlet and a shell outlet in fluid communication with the warming fluid chamber; and b. wherein the heat exchanger main line includes a single line having a plurality of cryogenic fluid coils positioned within the warming fluid chamber.

7. The system of claim 6 wherein the heat exchanger reheat line includes a plurality of cryogenic fluid coils positioned within the warming fluid chamber.

8. The system of claim 7 wherein the shell inlet and shell outlet are configured to communicate with a cooling system of an engine powered by the cryogenic fluid.

9. The system of claim 6 wherein the shell inlet and shell outlet are configured to communicate with a cooling system of an engine powered by the cryogenic fluid.

10. The system of claim 1 further comprising an economizer circuit in fluid communication with the liquid pickup line.

11. The system of claim 1 further comprising an automatic shutoff valve having an inlet in fluid communication with the combined stream outlet of the trim heater return tee and an outlet configured to provide cryogenic fluid to a use device.

12. The system of claim 11 wherein the cryogenic liquid is liquid natural gas and the use device is an LNG-powered engine.

13. A system for delivering cryogenic fluid from a tank comprising:
 a. a heat exchanger having a main line and a reheat line;
 b. a liquid pickup line having an inlet configured to receive cryogenic liquid from the tank and an outlet in fluid communication with the main line of the heat exchanger;
 c. a trim heater exit tee having an inlet in fluid communication with the main line of the heat exchanger, a trim heater outlet and an engine outlet;
 d. a trim heater return tee having a primary inlet, a trim heater inlet and a combined stream outlet;
 e. a flow restriction device having a flow restriction device inlet and a flow restriction device outlet;
 f. an uninterrupted flow passage extending from the engine outlet of the exit tee to the flow restriction device inlet;
 g. said flow restriction device inlet configured to receive fluid from the engine outlet of the trim heater exit tee and said flow restriction device outlet configured to direct fluid to the primary inlet of the trim heater return tee, said flow restriction device configured to provide a partial flow of fluid therethrough so as to cause a differential pressure between the trim heater exit tee and the trim heater return tee so that a primary portion of fluid from the main line of the heat exchanger flows continuously through the engine outlet and a remainder portion of fluid from the main line of the heat exchanger is simultaneously diverted through the trim heater outlet; and
 h. a trim heater line having an inlet in fluid communication with the trim heater outlet of the trim heater exit tee and an outlet in fluid communication with an inlet of the reheat line of the heat exchanger, wherein a portion of the trim heater line is positioned within the tank, and wherein an outlet of the reheat line of the heat exchanger is in fluid communication with the trim heater inlet of the trim heater return tee so that said trim heater return tee combines the primary portion of fluid and the remainder portion of fluid.

14. The system of claim 13 further comprising an excess flow valve having an inlet in fluid communication with the liquid pickup line and an outlet in fluid communication with the main line of the heat exchanger.

15. The system of claim 14 further comprising a fuel shut off valve having an inlet in fluid communication with the liquid pickup line and an outlet in fluid communication with the inlet of the excess flow valve.

16. The system of claim 15 further comprising a check valve having an inlet in fluid communication with the liquid pickup line and an outlet in fluid communication with the inlet of the fuel shut off valve.

17. The system of claim 13 wherein the flow restriction device is an orifice, a needle valve, a regulator or a check valve.

18. The system of claim 13 wherein the heat exchanger includes:
 a. a shell defining a warming fluid chamber and having a shell inlet and a shell outlet in fluid communication with the warming fluid chamber; and
 b. wherein the heat exchanger main line includes a plurality of cryogenic fluid coils positioned within the warming fluid chamber.

19. The system of claim 18 wherein the heat exchanger reheat line includes a single line having a plurality of cryogenic fluid coils positioned within the warming fluid chamber.

20. The system of claim 18 wherein the shell inlet and shell outlet are configured to communicate with a cooling system of an engine powered by the cryogenic fluid.

21. The system of claim 13 further comprising an economizer circuit in fluid communication with the liquid pickup line.

22. The system of claim 13 further comprising an automatic shutoff valve having an inlet in fluid communication with the combined stream outlet of the trim heater return tee and an outlet configured to provide cryogenic fluid to a use device.

23. The system of claim 22 wherein the cryogenic liquid is liquid natural gas and the use device is an LNG-powered engine.

24. The cryogenic fluid delivery system of claim 1 wherein the engine outlet of the trim heater exit tee is configured to direct the primary portion of fluid directly to the flow restriction device without additional heating by the heat exchanger.

25. The cryogenic fluid delivery system of claim 13 wherein the engine outlet of the trim heater exit tee is configured to direct the primary portion of fluid directly to the flow restriction device without additional heating by the heat exchanger.

* * * * *